(12) United States Patent
Zhang et al.

(10) Patent No.: US 10,223,597 B2
(45) Date of Patent: Mar. 5, 2019

(54) METHOD AND SYSTEM FOR CALCULATING PASSENGER CROWDEDNESS DEGREE

(71) Applicant: SHENZHEN UNIVERSITY, Shenzhen, Guangdong (CN)

(72) Inventors: Yong Zhang, Guangdong (CN); Lei Liu, Guangdong (CN); Dongning Zhao, Guangdong (CN); Yanshan Li, Guangdong (CN); Jianyong Chen, Guangdong (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 15/628,605

(22) Filed: Jun. 20, 2017

(65) Prior Publication Data

US 2017/0286780 A1    Oct. 5, 2017

Related U.S. Application Data

(63) Continuation of application No. PCT/CN2016/076740, filed on Mar. 18, 2016.

(51) Int. Cl.
*G06K 9/00* (2006.01)
*G06T 7/215* (2017.01)
*G06K 9/46* (2006.01)
*G06K 9/62* (2006.01)
*G06K 9/32* (2006.01)

(52) U.S. Cl.
CPC ..... *G06K 9/00778* (2013.01); *G06K 9/00624* (2013.01); *G06K 9/00832* (2013.01); *G06K 9/4614* (2013.01); *G06K 9/4652* (2013.01); *G06K 9/6257* (2013.01); *G06T 7/215* (2017.01); *G06K 2009/3291* (2013.01);
(Continued)

(58) Field of Classification Search
None
See application file for complete search history.

(56) References Cited

U.S. PATENT DOCUMENTS

| 2012/0182390 A1* | 7/2012 | Purvis | G06K 9/00771 |
| | | | 348/46 |
| 2015/0317797 A1* | 11/2015 | Lu | G06K 9/00778 |
| | | | 382/103 |
| 2017/0200082 A1* | 7/2017 | Bohm | G06Q 10/06 |

FOREIGN PATENT DOCUMENTS

| CN | 101464946 A | * | 6/2009 |
| CN | 104268506 A | * | 1/2015 |

* cited by examiner

Primary Examiner — Delomia L Gilliard

(57) ABSTRACT

The disclosure provides a method for calculating a passenger crowdedness degree, comprising: establishing a video data collection environment and starting collecting video data of passengers getting on and off; reading the collected video data of passengers getting on and off and pre-processing a plurality of successive image frames of the video data; identifying a human head according to the pre-processing result and taking the detected human head as a target object to be tracked by mean-shift; and judging the behaviors of getting on and off of a passenger in the area where the target object is positioned and determining the crowdedness degree of passengers inside a vehicle according to the numbers of the passengers getting on and off. The disclosure also provides a system for calculating a passenger crowdedness degree. The disclosure can effectively reduce the false detection, leak detection and error detection of the head top.

6 Claims, 6 Drawing Sheets

(52) U.S. Cl.
CPC ............... *G06T 2207/30201* (2013.01); *G06T 2207/30242* (2013.01); *G06T 2207/30252* (2013.01)

METHOD AND SYSTEM FOR CALCULATING PASSENGER CROWDEDNESS DEGREE

CROSS REFERENCE TO RELATED APPLICATION

The present application is a Continuation Application of PCT application No. PCT/CN2016/076740 filed on Mar. 18, 2016. All the above are hereby incorporated by reference.

TECHNICAL FIELD

The disclosure relates to the field of public transportation, and in particular to a method and a system for calculating a passenger crowdedness degree.

BACKGROUND

With the development of urbanization, urban population increases rapidly, and China's large and medium-sized cities face increasingly severe traffic pressure. In some large cities, traffic jam at rush hours seriously blocks the sustainable development of the cities. One effective measure to solve the traffic jam at rush hours is to encourage city residents to take public buses; however, some bus routes short of transportation capacity at rush hours limit the enthusiasm of city residents taking public buses. The best measure to solve the transportation capacity shortage at rush hours is to improve the transportation capacity, however, simply increasing the number of public buses for hot routes will result in redundant transportation capacity at non-rush hours, this is neither economical nor green; therefore, a concept of intelligent scheduling for public transportation appears accordingly. The intelligent scheduling for public transportation is to gather statistics on the number of passengers getting on, the number of passengers getting off and the total number of passengers onboard for each bus of each route through a terminal mounted on each bus, so as to monitor the passenger load condition of each bus route at each time period. In addition, the intelligent scheduling for public transportation also can perform deeper data mining using the history data of passenger flow about getting on and getting off of each bus stop at each time period, to provide a basis for planning a reasonable efficient bus route. Therefore, as the most important part of an intelligent scheduling system for public transportation, the accurate statistics on the number of bus passengers is the key to realize the intelligent scheduling system for public transportation.

Traditional passenger flow statistics method is to gather statistics using manual detection, or using contact devices such as bus money-box and card swiping machine. Herein, for the method adopting manual statistics to obtain the passenger flow data, although the accuracy can meet the requirement, a lot of labor forces and financial forces are consumed, the cost is high and the timeliness is poor. A secondary method is using an infrared detection system, although the infrared detection system can realize the statistics on the numbers of passengers getting on and getting off simultaneously, the infrared device is easy to be interfered by external factors, for example, error statistics probably may be caused if passengers pass through continuously or stay for a long time, the infrared detection system cannot meet the accuracy requirement of passenger number statistics for the intelligent scheduling system for public transportation. Meanwhile, since the infrared system can only realize the statistics of the passengers passing through the bus door and cannot judge the movement direction of the passengers, that is, the infrared system cannot realize the double-direction counting of passengers of a single bus door; therefore, the infrared system is not applicable to a rapid transport system which makes no distinction between an entrance door and an exit door. As the coverage of the rapid transport system becomes wider and wider, the detection measure using the infrared ray to count the number of bus passengers has an increasingly lower applicability.

SUMMARY

In view of this, the purpose of the disclosure is to provide a method and a system for calculating a passenger crowdedness degree, so as to solve the problem of low accuracy of passenger flow statistics in existing technologies.

The disclosure provides a method for calculating a passenger crowdedness degree, including:

establishing a video data collection environment and starting collecting video data of passengers getting on and off;

reading the collected video data of passengers getting on and off and pre-processing a plurality of successive image frames of the video data;

identifying a human head according to the pre-processing result and taking the detected human head as a target object to be tracked by mean-shift; and judging the behaviours of getting on and off of a passenger in the area where the target object is positioned and determining the crowdedness degree of passengers inside a vehicle according to the numbers of passengers getting on and off.

Preferably, the step of reading the collected video data of passengers getting on and off and pre-processing a plurality of successive image frames of the video data specifically includes:

reading the frame format of the collected video data of passengers getting on and off and determining the number of frames;

establishing a single Gaussian model for each pixel point in an initial frame;

analyzing the change of pixel points of a plurality of successive image frames and judging each pixel point in the image frame to be static background or dynamic foreground;

modifying the pixel value of the pixel point judged to be static background and not modifying the pixel value of the pixel point judged to be dynamic foreground; and recording the number of times each pixel point in the image frame is judged to be static background continuously; if the number of times is greater than or equal to a preset threshold, immediately updating the RGB value of this pixel point to background; and if the pixel point is not judged to be static background continuously, recording again.

Preferably, the step of identifying a human head according to the pre-processing result and taking the detected human head as a target object to be tracked by mean-shift specifically includes:

producing a cascade classifier which is configured to judge head top, by utilizing a plurality of collected positive samples containing human heads and negative samples not containing human heads;

limiting the size range of a detection window detecting head top in the cascade classifier;

identifying human heads according to the cascade classifier with the detection window size limited; and taking the detected human head as a target object to be tracked by mean-shift.

Preferably, the step of judging the behaviours of getting on and off of a passenger in the area where the target object is positioned and determining the crowdedness degree of passengers inside a vehicle according to the numbers of passengers getting on and off specifically includes:

setting two detection lines in an area seen by a camera, and, if the mass centre of the target object to be tracked by mean-shift passes through the two detection lines, judging that the passenger is getting on or off; and determining the total number of passengers actually carried by calculating the numbers of passengers getting on and off, and measuring the crowdedness degree of passengers inside the vehicle using the ratio of the total number of passengers to the maximum passenger capacity inside the vehicle.

On the other hand, the disclosure further provides a system for calculating a passenger crowdedness degree, including:

a data collection module, which is configured to establish a video data collection environment and start collecting video data of passengers getting on and off;

a pre-processing module, which is configured to read the collected video data of passengers getting on and off and pre-process a plurality of successive image frames of the video data;

an object determination module, which is configured to identify a human head according to the pre-processing result and take the detected human head as a target object to be tracked by mean-shift; and a crowdedness judgment module, which is configured to judge the behaviours of getting on and off of a passenger in the area where the target object is positioned and determine the crowdedness degree of passengers inside a vehicle according to the numbers of passengers getting on and off.

Preferably, the pre-processing module includes:

a frame reading sub-module, which is configured to read the frame format of the collected video data of passengers getting on and off and determine the number of frames;

a model establishment sub-module, which is configured to establish a single Gaussian model for each pixel point in an initial frame;

a state sub-module, which is configured to analyze the change of pixel points of a plurality of successive image frames and judge each pixel point in the image frame to be static background or dynamic foreground;

a modification sub-module, which is configured to modify the pixel value of the pixel point judged to be static background and not modify the pixel value of the pixel point judged to be dynamic foreground; and an update sub-module, which is configured to: record the number of times each pixel point in the image frame is judged to be static background continuously; if the number of times is greater than or equal to a preset threshold, immediately update the RGB value of this pixel point to background; and if the pixel point is not judged to be static background continuously, record again.

Preferably, the object determination module includes:

a production sub-module, which is configured to produce a cascade classifier which is configured to judge head top, by utilizing a plurality of collected positive samples containing human heads and negative samples not containing human heads;

a limit sub-module, which is configured to limit the size range of a detection window detecting head top in the cascade classifier;

an identification sub-module, which is configured to identify human heads according to the cascade classifier with the detection window size limited; and a target sub-module, which is configured to take the detected human head as a target object to be tracked by mean-shift.

Preferably, the crowdedness judgment module includes:

a first judgment sub-module, which is configured to set two detection lines in an area seen by a camera, and, if the mass centre of the target object to be tracked by mean-shift passes through the two detection lines, judge that the passenger is getting on or off; and a second judgment sub-module, which is configured to determine the total number of passengers actually carried by calculating the numbers of passengers getting on and off, and measure the crowdedness degree of passengers inside the vehicle using the ratio of the total number of passengers to the maximum passenger capacity inside the vehicle.

The technical scheme provided by the disclosure adopts the pre-processing eliminating static background to effectively overcome the interference on the identification of head top in image frames caused by the change of light intensity and so on, and can effectively reduce the false detection, leak detection and error detection of the head top by limiting the size of the detection window.

DESCRIPTION OF THE EMBODIMENTS

To make the purpose, technical scheme and advantages of the disclosure more clearly understood, the disclosure is described in further detail below in conjunction with accompanying drawings and embodiments. It should be understood that the specific embodiments described below are merely to illustrate, but to limit, the disclosure.

The specific embodiment of the disclosure provides a method for calculating a passenger crowdedness degree, mainly including the following steps:

S11: establishing a video data collection environment and starting collecting video data of passengers getting on and off.

S12: reading the collected video data of passengers getting on and off and pre-processing a plurality of successive image frames of the video data.

S13: identifying a human head according to the pre-processing result and taking the detected human head as a target object to be tracked by mean-shift.

S14: judging the behaviours of getting on and off of a passenger in the area where the target object is positioned and determining the crowdedness degree of passengers inside a vehicle according to the numbers of passengers getting on and off.

The method for calculating a passenger crowdedness degree provided by the disclosure adopts the pre-processing eliminating static background to effectively overcome the interference on the identification of head top in image frames caused by the change of light intensity and so on, and can effectively reduce the false detection, leak detection and error detection of the head top by limiting the size of a detection window.

The method for calculating a passenger crowdedness degree provided by the disclosure is described below in detail.

Figure 1:
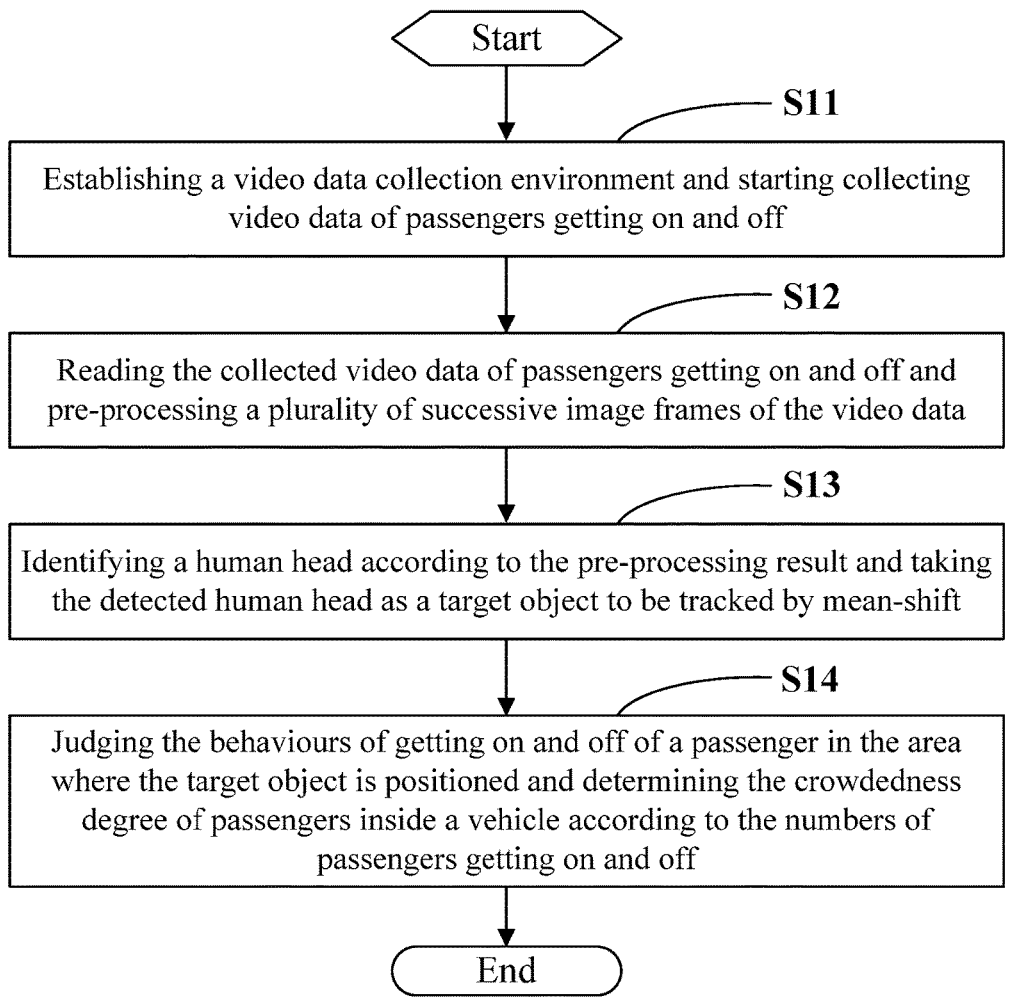
FIG. 1 is a flowchart of a method for calculating a passenger crowdedness degree in an embodiment of the disclosure.

Please refer to FIG. 1, which is a flowchart of a method for calculating a passenger crowdedness degree in an embodiment of the disclosure.

In S11: establishing a video data collection environment and starting collecting video data of passengers getting on and off.

In this embodiment, the video data collection environment is established by constructing an embedded vehicle system, the constructed embedded vehicle system includes hardware modules as follows: two video cameras, an embedded device master control module, a video storage module and a vehicle hardware power supply module; the two video cameras are respectively arranged on the top parts of a front door and a rear door, the video camera is arranged having 90 degrees relative to ground, the vision of the camera covers: steps for getting on and off, partial road outside the doors and partial vehicle body space inside the doors. In this embodiment, the vehicle embedded device collects video data of passengers getting on and off through the cameras mounted on the top parts of the front door and the back door of a bus, and the video data recorded by the two cameras are temporarily stored to the video storage module to be called for video processing. In this embodiment, the temporary storage of video data can effectively reduce the demand on the embedded hardware, thereby lowering the cost of the device.

In S12: reading the collected video data of passengers getting on and off and pre-processing a plurality of successive image frames of the video data.

Figure 2:
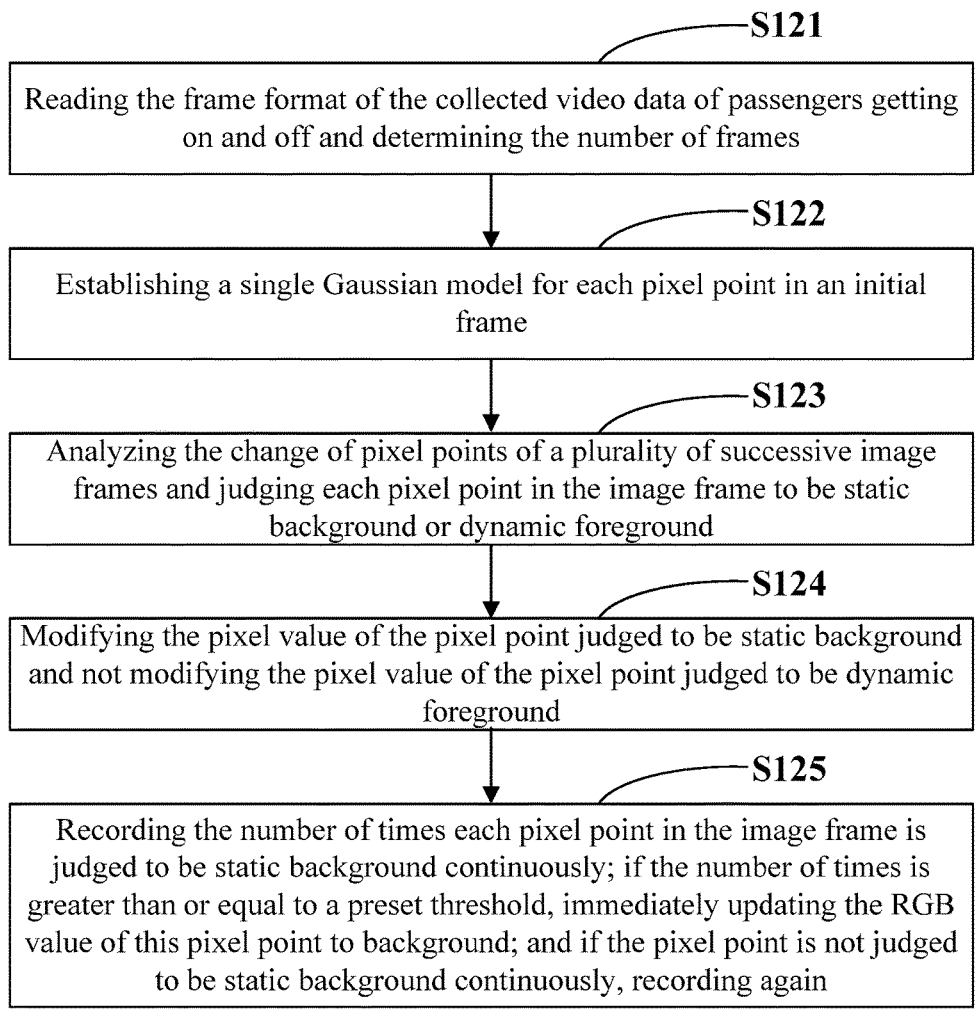
FIG. 2 is a detailed flowchart of S12 shown in FIG. 1 in an embodiment of the disclosure.

In this embodiment, the S12 of reading the collected video data of passengers getting on and off and pre-processing a plurality of successive image frames of the video data specifically includes S121 to S125, as shown in FIG. 2.

Please refer to FIG. 2, which is a detailed flowchart of S12 shown in FIG. 1 in an embodiment of the disclosure.

In S121: reading the frame format of the collected video data of passengers getting on and off and determining the number of frames.

In this embodiment, the embedded device master control module reads the frame format of the video data and determines the number of frames to determine the size m×n of a frame of image, where m indicates the number of rows of the image frame, and n indicates the number of columns of the image frame.

In S122: establishing a single Gaussian model for each pixel point in an initial frame.

In this embodiment, a single Gaussian model is established for each pixel point in the initial frame, the mean value of the single Gaussian model is initialized to be an RGB value of the pixel point, the variance initial constant is V, then a mixed Gaussian density function $p(x_t) = \Sigma_{i=1}^{K} W_{i,t} \eta(x_t, u_{i,t}, \tau_{i,t})$ is gradually constructed according to the change of pixel points, where $\tau_{i,t} = \sigma_{i,t}^2 I$, $\eta(x_t, \mu_{i,t}, \tau_{i,t})$ is the ith Gaussian distribution at t moment, I is a three-dimensional unit matrix, K is the total number of Gaussian distribution models, $\mu_{i,t}$, $W_{i,t}$, $\tau_{i,t}$ and $\sigma_{i,t}$ respectively express the mean value, weight value, covariance matrix and variance of each Gaussian function.

In S123: analyzing the change of pixel points of a plurality of successive image frames and judging each pixel point in the image frame to be static background or dynamic foreground.

In this embodiment, through the change of pixel points of a plurality of successive image frames, the single Gaussian model of the initial frame gradually changes to the mixed Gaussian model, each pixel point at least has K (K≥1) Gaussian functions, and, each pixel point in the image frame is judged to be static background or dynamic foreground according to the change between frames.

In this embodiment, according to the sequence of video streaming, RGB values of the total m×n pixel points of a latter frame of image are matched with the K (K≥1) Gaussian functions of the corresponding pixel points of a previous frame of image.

If matched with one or more of the K functions successfully, it is indicated that at least one of the K Gaussian functions can describe the change of the RGB value of the current pixel point, then the weight value $W_{i,t}$ of the successfully matched Gaussian function is increased; for the rest (K−1) Gaussian functions matched unsuccessfully, the mean value and variance thereof are updated, and the RGB value of the current pixel point is judged to be static background.

If matched unsuccessfully, it is indicated that none of the K Gaussian functions can describe the change of the RGB value of the current pixel point, then the Gaussian function with lowest weight value is deleted, a new Gaussian function is established and the RGB value of the current pixel point is taken as the mean value, V is taken as the variance, and the RGB value of the current pixel point is judged to be dynamic foreground.

In S124: modifying the pixel value of the pixel point judged to be static background and not modifying the pixel value of the pixel point judged to be dynamic foreground.

In this embodiment, the pixel value of the pixel point judged to be static background is modified to be $RGB_s$, where $RGB_s$ expresses an color with lowest occurrence frequency in daily life, the pixel value of the pixel point judged to be dynamic foreground is not modified; in this embodiment, the color modification made in this step reduces the interference of static background on the human head detection and trace tracking in following steps, and greatly improves the success rate of the following steps.

In S125: recording the number of times each pixel point in the image frame is judged to be static background continuously; if the number of times is greater than or equal to a preset threshold, immediately updating the RGB value of this pixel point to background; and if the pixel point is not judged to be static background continuously, recording again.

In this embodiment, to consider that mixed Gaussian background modelling needs time and, in actual scene, the time of getting on and off of passengers probably is less than the time of the mixed Gaussian modelling, a Gaussian function weight growth mechanism is added in view of the original mixed Gaussian modelling algorithm, that is: recording the number of times each pixel point in the image frame is judged to be static background continuously; if the number of times is greater than or equal to a preset threshold K, immediately updating the RGB value of this pixel point to background, without waiting the Gaussian function reaching the threshold in the original algorithm to update the RGB value of this pixel point; and if the pixel point is not judged to be static background continuously, recording again.

In this embodiment, each frame of image totally has m×n pixel points, the number K of Gaussian density functions belonging to each pixel point should not exceed 4; if the number exceeds 4, the Gaussian function with lowest weight value is deleted; through the opening and closing operation of image, small and isolated points generated by image pre-processing are deleted.

Please continue to refer to FIG. 1, in S13: identifying a human head according to the pre-processing result and taking the detected human head as a target object to be tracked by mean-shift.

Figure 3:
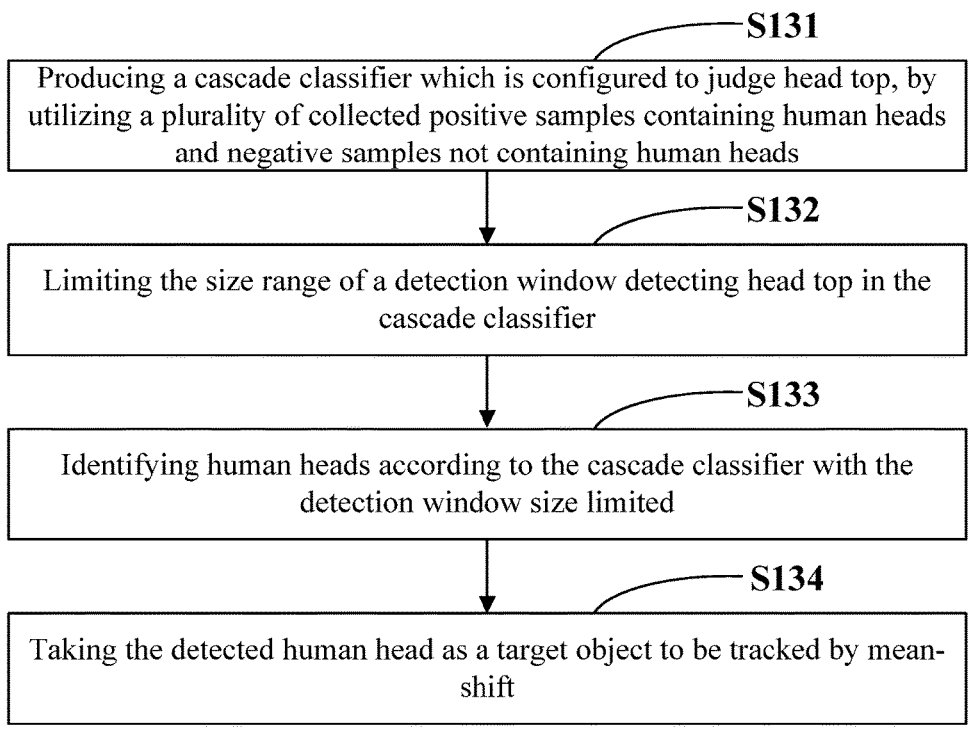
FIG. 3 is a detailed flowchart of S13 shown in FIG. 1 in an embodiment of the disclosure.

In this embodiment, the S13 of identifying a human head according to the pre-processing result and taking the detected human head as a target object to be tracked by mean-shift specifically includes S131 to S134, as shown in FIG. 3.

Please refer to FIG. 3, which is a detailed flowchart of S13 shown in FIG. 1 in an embodiment of the disclosure.

In S131: producing a cascade classifier which is configured to judge head top, by utilizing a plurality of collected positive samples containing human heads and negative samples not containing human heads.

In this embodiment, LBP feature based Adaboost training iteration training is performed on the plurality of collected positive samples containing human heads and negative samples not containing human heads (size 20*20) to produce the cascade classifier which is configured to judge head top.

In S132: limiting the size range of a detection window detecting head top in the cascade classifier.

In this embodiment, the image detection window of the cascade classifier is set to have a size w, the size is ensured to be between Wmin and Wmax, the Wmin and Wmax depend on the size of the bus, the position of human head is detected through the movement of the window w on the image frame, the movement detection rule adopts an integral image method; if human head is not detected, the detection window is zoomed in by 1.5 times, but not exceeding the range between Wmin and Wmax.

In S133: identifying human heads according to the cascade classifier with the detection window size limited.

In this embodiment, human head samples not meeting the size range condition of S132 and already judged to be head top by S131 are deleted; we cannot just accept the detection result of the cascade classifier of the single S131, only head top samples simultaneously meeting S131 and S132 can be accepted by following steps.

In S134: taking the detected human head as a target object to be tracked by mean-shift.

Please continue to refer to FIG. 1, in S14: judging the behaviours of getting on and off of a passenger in the area where the target object is positioned and determining the crowdedness degree of passengers inside a vehicle according to the numbers of passengers getting on and off.

Figure 4:
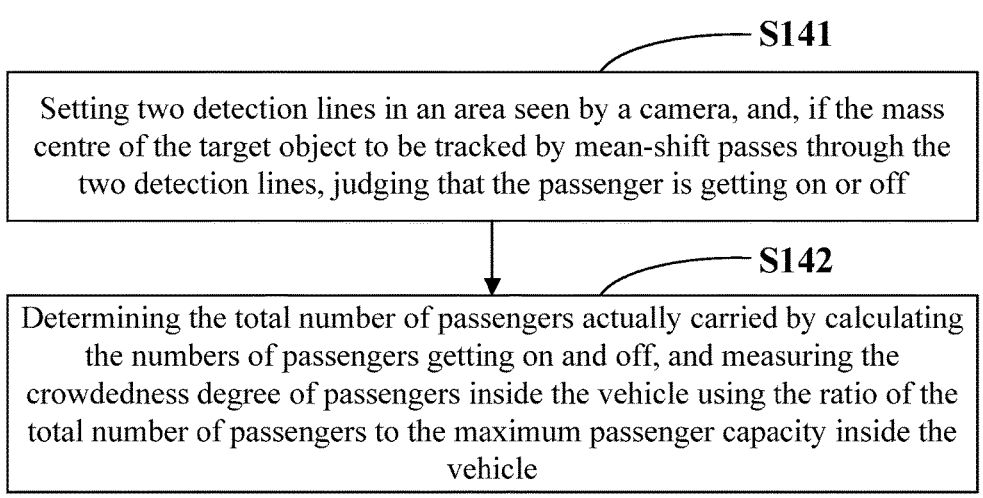
FIG. 4 is a detailed flowchart of S14 shown in FIG. 1 in an embodiment of the disclosure.

In this embodiment, the S14 of judging the behaviours of getting on and off of a passenger in the area where the target object is positioned and determining the crowdedness degree of passengers inside a vehicle according to the numbers of passengers getting on and off specifically includes S141 to S142, as shown in FIG. 4.

Please refer to FIG. 4, which is a detailed flowchart of S14 shown in FIG. 1 in an embodiment of the disclosure.

In S141: setting two detection lines in an area seen by a camera, and, if the mass centre of the target object to be tracked by mean-shift passes through the two detection lines, judging that the passenger is getting on or off.

In this Embodiment, two detection lines are set in the area seen by the camera, respectively set on the road surface with certain distance from the outer side of the vehicle door and on the vehicle floorboard with certain distance from the inner side of vehicle door; the detected human head is taken as a target object to be tracked by mean-shift, and the probability density estimation $\{q_u\}_{u=1\ldots m}$ (where u is the colour index of a histogram), target estimated centre position y0 and kernel-bandwidth h of the area are calculated.

In this embodiment, the region histogram of the current frame is calculated by taking the estimated centre position y0 of the (n−1)th frame target object as the search window centre coordinate; the similarity of corresponding histograms of a target template and a candidate area template is calculated using a BH coefficient, where the bigger the BH coefficient, the higher the similarity; the position of the maximum BH coefficient is the new position of the target; by calculating the mass centre coordinate of the target object in each frame, if the mass centre passes through the getting-on/off detection lines, the behaviours of getting on and off of a passenger are judged.

S142: determining the total number of passengers actually carried by calculating the numbers of passengers getting on and off, and measuring the crowdedness degree of passengers inside the vehicle using the ratio of the total number of passengers to the maximum passenger capacity inside the vehicle.

In this embodiment, the total number of passengers in the vehicle is obtained by subtracting the number of passengers getting off from the number of passengers getting on, a crowdedness factor describing the crowdedness in the bus may be obtained by calculating the ratio of the total number of passengers actually carried to the maximum passenger capacity of the bus; the higher the factor, the more crowded the bus; the lower the factor, the less crowded the bus.

The method for calculating a passenger crowdedness degree provided by the disclosure adopts the pre-processing eliminating static background to effectively overcome the interference on the identification of head top in image frames caused by the change of light intensity and so on, and can effectively reduce the false detection, leak detection and error detection of the head top by limiting the size of the detection window.

The specific embodiment of the disclosure further provides a system 10 for calculating a passenger crowdedness degree, mainly including:

a data collection module 11, which is configured to establish a video data collection environment and start collecting video data of passengers getting on and off;

a pre-processing module 12, which is configured to read the collected video data of passengers getting on and off and pre-process a plurality of successive image frames of the video data;

an object determination module 13, which is configured to identify a human head according to the pre-processing result and take the detected human head as a target object to be tracked by mean-shift; and a crowdedness judgment module 14, which is configured to judge the behaviours of getting on and off of a passenger in the area where the target object is positioned and determine the crowdedness degree of passengers inside a vehicle according to the numbers of passengers getting on and off.

The system 10 for calculating a passenger crowdedness degree provided by the disclosure adopts the pre-processing eliminating static background to effectively overcome the interference on the identification of head top in image frames caused by the change of light intensity and so on, and can effectively reduce the false detection, leak detection and error detection of the head top by limiting the size of a detection window.

Figure 5:
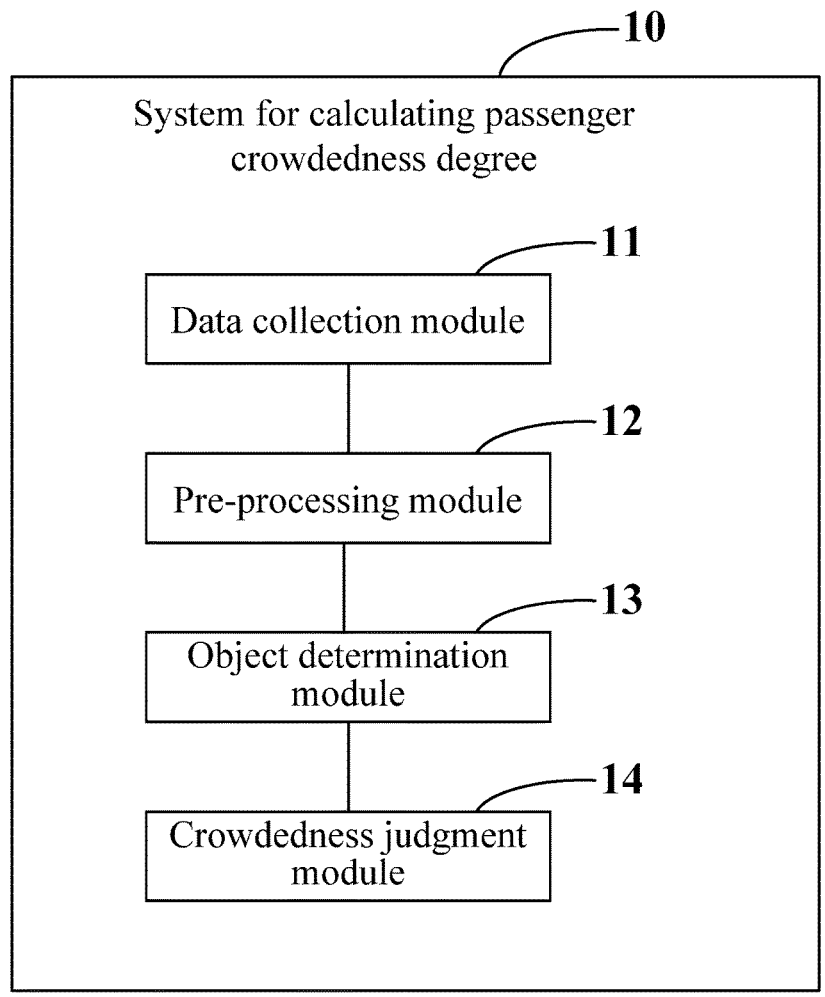
FIG. 5 is an internal structure diagram of a system 10 for calculating a passenger crowdedness degree in an embodiment of the disclosure.

Please refer to FIG. 5, which is a structure diagram of the system 10 for calculating a passenger crowdedness degree in an embodiment of the disclosure. In this embodiment, the system 10 for calculating a passenger crowdedness degree mainly includes a data collection module 11, a pre-processing module 12, an object determination module 13 and a crowdedness judgment module 14.

The data collection module 11 which is configured to establish a video data collection environment and start collecting video data of passengers getting on and off. In this embodiment, the specific collection method of video data can refer to the relevant description in the previous S11, and description is not repeated here.

The pre-processing module 12 is configured to read the collected video data of passengers getting on and off and pre-process a plurality of successive image frames of the video data.

Figure 6:
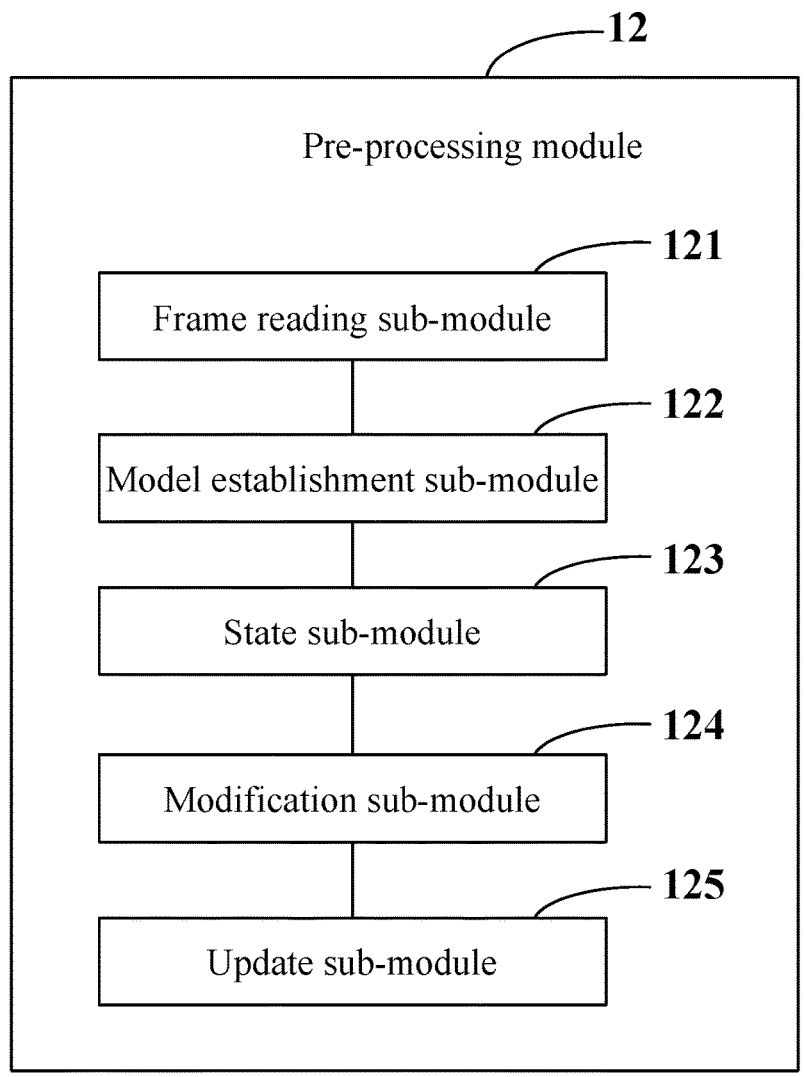
FIG. 6 is an internal structure diagram of a pre-processing module 12 shown in FIG. 5 in an embodiment of the disclosure.

In this embodiment, the pre-processing module 12 specifically includes a frame reading sub-module 121, a model establishment sub-module 122, a state sub-module 123, a modification sub-module 124 and an update sub-module 125, as shown in FIG. 6.

Please refer to FIG. 6, which is an internal structure diagram of the pre-processing module 12 shown in FIG. 5 in an embodiment of the disclosure.

The frame reading sub-module 121 is configured to read the frame format of the collected video data of passengers getting on and off and determine the number of frames.

The model establishment sub-module 122 is configured to establish a single Gaussian model for each pixel point in an initial frame. In this embodiment, the specific establishment method of Gaussian model can refer to the relevant description in the previous S122, and description is not repeated here.

The state sub-module 123 is configured to analyze the change of pixel points of a plurality of successive image frames and judge each pixel point in the image frame to be static background or dynamic foreground. In this embodiment, the specific judgment method can refer to the relevant description in the previous S123, and description is not repeated here.

The modification sub-module 124 is configured to modify the pixel value of the pixel point judged to be static background and not modify the pixel value of the pixel point judged to be dynamic foreground.

The update sub-module 125 is configured to: record the number of times each pixel point in the image frame is judged to be static background continuously; if the number of times is greater than or equal to a preset threshold, immediately update the RGB value of this pixel point to background; and if the pixel point is not judged to be static background continuously, record again. In this embodiment, the specific update method can refer to the relevant description in the previous S125, and description is not repeated here.

Please continue to refer to FIG. 5, the object determination module 13 is configured to identify a human head according to the pre-processing result and take the detected human head as a target object to be tracked by mean-shift.

Figure 7:
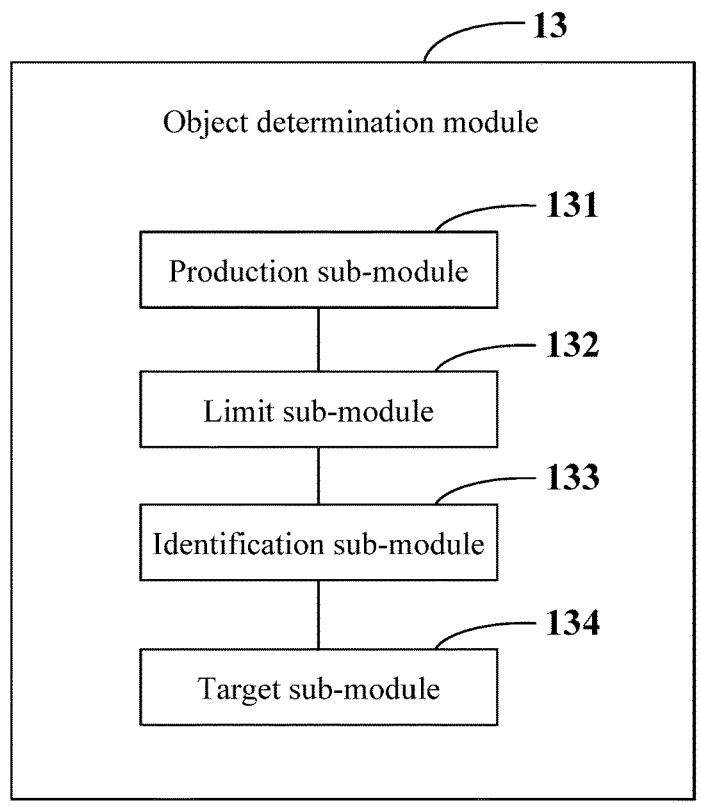
FIG. 7 is an internal structure diagram of an object determination module 13 shown in FIG. 5 in an embodiment of the disclosure.

In this embodiment, the object determination module 13 specifically includes a production sub-module 131, a limit sub-module 132, an identification sub-module 133 and a target sub-module 134, as shown in FIG. 7.

Please refer to FIG. 7, which is an internal structure diagram of the object determination module 13 shown in FIG. 5 in an embodiment of the disclosure.

The production sub-module 131 is configured to produce a cascade classifier which is configured to judge head top, by utilizing a plurality of collected positive samples containing human heads and negative samples not containing human heads.

In this embodiment, LBP feature based Adaboost training iteration training is performed on the plurality of collected positive samples containing human heads and negative samples not containing human heads (size 20*20) to produce the cascade classifier which is configured to judge head top.

The limit sub-module 132 is configured to limit the size range of a detection window detecting head top in the cascade classifier.

In this embodiment, the image detection window of the cascade classifier is set to have a size w, the size is ensured to be between Wmin and Wmax, the Wmin and Wmax depend on the size of the bus, the position of human head is detected through the movement of the window w on the image frame, the movement detection rule adopts an integral image method; if human head is not detected, the detection window is zoomed in by 1.5 times, but not exceeding the range between Wmin and Wmax.

The identification sub-module 133 is configured to identify human heads according to the cascade classifier with the detection window size limited.

The target sub-module 134 is configured to take the detected human head as a target object to be tracked by mean-shift.

Please continue to refer to FIG. 5, the crowdedness judgment module 14 is configured to judge the behaviours of getting on and off of a passenger in the area where the target object is positioned and determine the crowdedness degree of passengers inside a vehicle according to the numbers of passengers getting on and off.

Figure 8:
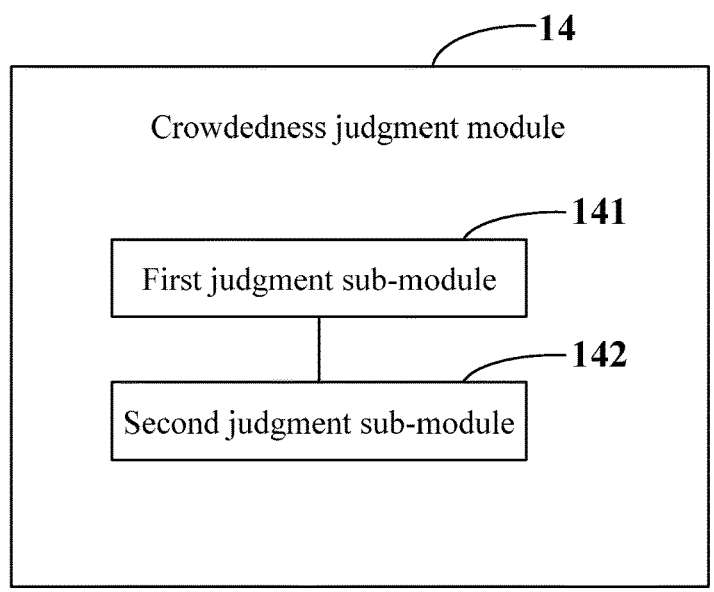
FIG. 8 is an internal structure diagram of a crowdedness judgment module 14 shown in FIG. 5 in an embodiment of the disclosure.

In this embodiment, the crowdedness judgment module 14 specifically includes a first judgment sub-module 141 and a second judgment sub-module 142, as shown in FIG. 8.

Please refer to FIG. 8, which is an internal structure diagram of the crowdedness judgment module 14 shown in FIG. 5 in an embodiment of the disclosure.

The first judgment sub-module 141 is configured to set two detection lines in an area seen by a camera, and, if the mass centre of the target object to be tracked by mean-shift passes through the two detection lines, judge that the passenger is getting on or off.

In this Embodiment, two detection lines are set in the area seen by the camera, respectively set on the road surface with certain distance from the outer side of the vehicle door and on the vehicle floorboard with certain distance from the inner side of vehicle door; the detected human head is taken as a target object to be tracked by mean-shift, and the probability density estimation $\{q_u\}_{u=1 \ldots m}$ (where u is the colour index of a histogram), target estimated centre position y0 and kernel-bandwidth h of the area are calculated.

In this embodiment, the region histogram of the current frame is calculated by taking the estimated centre position y0 of the (n−1)th frame target object as the search window centre coordinate; the similarity of corresponding histograms of a target template and a candidate area template is calculated using a BH coefficient, where the bigger the BH coefficient, the higher the similarity; the position of the maximum BH coefficient is the new position of the target; by calculating the mass centre coordinate of the target object in each frame, if the mass centre passes through the getting-on/off detection lines, the behaviours of getting on and off of a passenger are judged.

The second judgment sub-module 142 is configured to determine the total number of passengers actually carried by calculating the numbers of passengers getting on and off, and measure the crowdedness degree of passengers inside the vehicle using the ratio of the total number of passengers to the maximum passenger capacity inside the vehicle.

In this embodiment, the total number of passengers in the vehicle is obtained by subtracting the number of passengers getting off from the number of passengers getting on, a crowdedness factor describing the crowdedness in the bus may be obtained by calculating the ratio of the total number of passengers actually carried to the maximum passenger capacity of the bus; the higher the factor, the more crowded the bus; the lower the factor, the less crowded the bus.

The system 10 for calculating a passenger crowdedness degree provided by the disclosure adopts the pre-processing eliminating static background to effectively overcome the interference on the identification of head top in image frames caused by the change of light intensity and so on, and can effectively reduce the false detection, leak detection and error detection of the head top by limiting the size of the detection window.

It should be noted that, in the above embodiments, each unit involved is a division of logical function merely, but is not limited to the above division, only if corresponding function can be realized; in addition, the specific name of each function unit is just for facilitating distinguishing between each other, but to limit the scope of protection of the disclosure.

In addition, the ordinary staff in this field can understand that: all or part steps to implement the above method embodiments may be completed through a program instructing related hardware, the program may be stored in a computer readable storage medium, the storage medium includes, for example, Read-Only Memory (ROM), Random Access Memory (RAM), disk or compact disk and so on.

The above are preferred embodiments of the disclosure merely, and are not intended to limit the disclosure. Any modifications, equivalent substitutes and improvements, etc., made within the spirit and principle of the disclosure all are intended to be included in the protection scope of the present invention.

What is claimed is:

1. A method for calculating a passenger crowdedness degree, characterized in that the method comprises:
   establishing a video data collection environment and starting collecting video data of passengers getting on and off;
   reading the collected video data of passengers getting on and off and pre-processing a plurality of successive image frames of the video data;
   identifying a human head according to the pre-processing result and taking the detected human head as a target object to be tracked by mean-shift; and
   judging the behaviours of getting on and off of a passenger in the area where the target object is positioned and determining the crowdedness degree of passengers inside a vehicle according to the numbers of passengers getting on and off;
   the step of reading the collected video data of passengers getting on and off and pre-processing a plurality of successive image frames of the video data specifically comprises:
   reading the frame format of the collected video data of passengers getting on and off and determining the number of frames;
   establishing a single Gaussian model for each pixel point in an initial frame;
   analyzing the change of pixel points of a plurality of successive image frames and judging each pixel point in the image frame to be static background or dynamic foreground;
   modifying the pixel value of the pixel point judged to be static background and not modifying the pixel value of the pixel point judged to be dynamic foreground; and
   recording the number of times each pixel point in the image frame is judged to be static background continuously; if the number of times is greater than or equal to a preset threshold, immediately updating the RGB value of this pixel point to background; and if the pixel point is not judged to be static background continuously, recording again.

2. The method for calculating a passenger crowdedness degree according to claim 1, characterized in that the step of identifying a human head according to the pre-processing result and taking the detected human head as a target object to be tracked by mean-shift specifically comprises:
   producing a cascade classifier which is configured to judge head top, by utilizing a plurality of collected positive samples containing human heads and negative samples not containing human heads;
   limiting the size range of a detection window detecting head top in the cascade classifier;
   identifying human heads according to the cascade classifier with the detection window size limited; and
   taking the detected human head as a target object to be tracked by mean-shift.

3. The method for calculating a passenger crowdedness degree according to claim 1, characterized in that the step of judging the behaviours of getting on and off of a passenger in the area where the target object is positioned and determining the crowdedness degree of passengers inside a vehicle according to the numbers of passengers getting on and off specifically comprises:
   setting two detection lines in an area seen by a camera, and, if the mass centre of the target object to be tracked by mean-shift passes through the two detection lines, judging that the passenger is getting on or off; and
   determining the total number of passengers actually carried by calculating the numbers of passengers getting on and off, and measuring the crowdedness degree of passengers inside the vehicle using the ratio of the total number of passengers to the maximum passenger capacity inside the vehicle.

4. A system for calculating a passenger crowdedness degree, characterized in that the system comprises:

a data collection module, which is configured to establish a video data collection environment and start collecting video data of passengers getting on and off;

a pre-processing module, which is configured to read the collected video data of passengers getting on and off and pre-process a plurality of successive image frames of the video data;

an object determination module, which is configured to identify a human head according to the pre-processing result and take the detected human head as a target object to be tracked by mean-shift; and a crowdedness judgment module, which is configured to judge the behaviours of getting on and off of a passenger in the area where the target object is positioned and determine the crowdedness degree of passengers inside a vehicle according to the numbers of passengers getting on and off;

the pre-processing module comprises:

a frame reading sub-module, which is configured to read the frame format of the collected video data of passengers getting on and off and determine the number of frames;

a model establishment sub-module, which is configured to establish a single Gaussian model for each pixel point in an initial frame;

a state sub-module, which is configured to analyze the change of pixel points of a plurality of successive image frames and judge each pixel point in the image frame to be static background or dynamic foreground;

a modification sub-module, which is configured to modify the pixel value of the pixel point judged to be static background and not modify the pixel value of the pixel point judged to be dynamic foreground; and an update sub-module, which is configured to: record the number of times each pixel point in the image frame is judged to be static background continuously; if the number of times is greater than or equal to a preset threshold, immediately update the RGB value of this pixel point to background; and if the pixel point is not judged to be static background continuously, record again.

5. The system for calculating a passenger crowdedness degree according to claim 4, characterized in that the object determination module comprises:

a production sub-module, which is configured to produce a cascade classifier which is configured to judge head top, by utilizing a plurality of collected positive samples containing human heads and negative samples not containing human heads;

a limit sub-module, which is configured to limit the size range of a detection window detecting head top in the cascade classifier;

an identification sub-module, which is configured to identify human heads according to the cascade classifier with the detection window size limited; and a target sub-module, which is configured to take the detected human head as a target object to be tracked by mean-shift.

6. The system for calculating a passenger crowdedness degree according to claim 5, characterized in that the crowdedness judgment module comprises:

a first judgment sub-module, which is configured to set two detection lines in an area seen by a camera, and, if the mass centre of the target object to be tracked by mean-shift passes through the two detection lines, judge that the passenger is getting on or off; and a second judgment sub-module, which is configured to determine the total number of passengers actually carried by calculating the numbers of passengers getting on and off, and measure the crowdedness degree of passengers inside the vehicle using the ratio of the total number of passengers to the maximum passenger capacity inside the vehicle.

* * * * *